US008844647B2

(12) United States Patent
Kamegai et al.

(10) Patent No.: US 8,844,647 B2
(45) Date of Patent: Sep. 30, 2014

(54) POWER TOOL

(75) Inventors: Hikaru Kamegai, Anjo (JP); Masanori Furusawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 183 days.

(21) Appl. No.: 13/192,089

(22) Filed: Jul. 27, 2011

(65) Prior Publication Data

US 2012/0031638 A1 Feb. 9, 2012

(30) Foreign Application Priority Data

Aug. 3, 2010 (JP) ................................ 2010-174647

(51) Int. Cl.
*B23D 11/00* (2006.01)
*B25D 17/24* (2006.01)

(52) U.S. Cl.
CPC ........ *B25D 17/245* (2013.01); *B25D 2250/121* (2013.01); *B25D 2217/0092* (2013.01); *B25D 2250/245* (2013.01); *B25D 2250/065* (2013.01); *B25D 2217/0084* (2013.01)
USPC ............................ 173/210; 173/211; 173/213

(58) Field of Classification Search
CPC ........... B25D 17/24; B25D 2217/0092; B25D 2217/0084; B25D 2250/371; B25D 2250/095; B25D 2250/391; F16F 7/116; F16F 15/22
USPC ......................................... 173/138, 210–213
See application file for complete search history.

(56) References Cited

U.S. PATENT DOCUMENTS 2,875,731 A 3/1959 Settles et al.
5,806,453 A * 9/1998 Cook ........................ 114/230.1
5,813,805 A * 9/1998 Kopras ..................... 408/241 R
6,148,930 A * 11/2000 Berger et al. .............. 173/162.2
6,443,675 B1 * 9/2002 Kopras et al. ................. 409/182
6,754,935 B2 * 6/2004 Pozgay et al. .................. 16/422
6,776,245 B2 * 8/2004 Kristen et al. ................ 173/217
7,383,895 B2 * 6/2008 Aoki ............................ 173/201
7,424,768 B2 * 9/2008 Beruscha et al. ............... 16/422
7,513,047 B2 * 4/2009 Wu ................................ 30/392
(Continued)

FOREIGN PATENT DOCUMENTS

EP 1 464 449 A2 10/2004
EP 2 018 939 A2 1/2009
(Continued)

OTHER PUBLICATIONS

Nov. 24, 2011 Search Report issued in European Patent Application No. 11175992.4.

*Primary Examiner* — Thanh Truong
*Assistant Examiner* — Eyamindae Jallow
(74) *Attorney, Agent, or Firm* — Oliff PLC

(57) ABSTRACT

A representative power tool according to the invention performs a predetermined operation on a workpiece at least by axial linear movement of a tool bit 119 coupled to a front end region of a housing 103. The power tool includes driving mechanisms 113, 115 that are housed within the housing 103 and linearly drives the tool bit 119, and a dynamic vibration reducer 151 that has a weight 153 which is allowed to linearly move under a biasing force of an elastic element, and reduces vibration caused during operation, by movement of the weight 153 in the axial direction of the tool bit. A dynamic vibration reducer housing space 149 for housing the weight 153 and the elastic element of the dynamic vibration reducer 151 is integrally formed with the housing 103.

10 Claims, 5 Drawing Sheets

(56) References Cited

U.S. PATENT DOCUMENTS

| | | | | |
|---|---|---|---|---|
| 7,600,579 | B2 * | 10/2009 | Wasielewski | 173/217 |
| 7,610,967 | B2 * | 11/2009 | Fischer et al. | 173/162.2 |
| 7,721,390 | B2 * | 5/2010 | Pfeiffer et al. | 16/426 |
| 8,087,472 | B2 * | 1/2012 | Usselman et al. | 173/1 |
| 8,091,651 | B2 * | 1/2012 | Kuhnle et al. | 173/162.2 |
| 8,181,715 | B2 * | 5/2012 | Bito et al. | 173/162.1 |
| 8,316,957 | B2 * | 11/2012 | Kuhnle et al. | 173/162.2 |
| 8,347,981 | B2 * | 1/2013 | Aoki | 173/211 |
| 8,403,076 | B2 * | 3/2013 | Iwakami | 173/162.1 |
| 8,434,565 | B2 * | 5/2013 | Hecht et al. | 173/162.1 |
| 2006/0076154 | A1 * | 4/2006 | Aoki | 173/212 |
| 2006/0289185 | A1 * | 12/2006 | Hahn | 173/210 |
| 2007/0017684 | A1 * | 1/2007 | Stirm et al. | 173/109 |
| 2007/0039749 | A1 * | 2/2007 | Aoki | 173/201 |
| 2009/0025949 | A1 * | 1/2009 | Aoki | 173/162.1 |
| 2009/0032275 | A1 * | 2/2009 | Ikuta et al. | 173/117 |
| 2009/0120658 | A1 * | 5/2009 | Kuhnle et al. | 173/211 |
| 2009/0151967 | A1 * | 6/2009 | Haas et al. | 173/162.1 |
| 2009/0188691 | A1 * | 7/2009 | Hahn | 173/162.2 |
| 2009/0188692 | A1 * | 7/2009 | Hahn et al. | 173/210 |
| 2009/0223693 | A1 * | 9/2009 | Aoki | 173/211 |
| 2010/0051304 | A1 * | 3/2010 | Aoki | 173/114 |
| 2010/0155095 | A1 | 6/2010 | Furusawa et al. | |
| 2011/0000949 | A1 * | 1/2011 | Ito et al. | 227/138 |
| 2011/0155405 | A1 | 6/2011 | Aoki | |

FOREIGN PATENT DOCUMENTS

| | | | |
|---|---|---|---|
| EP | 2 193 885 | A1 | 6/2010 |
| EP | 2193885 | A1 * | 6/2010 |
| JP | A-2004-154903 | | 6/2004 |
| JP | A 2006-21261 | | 1/2006 |
| JP | A 2009-45732 | | 3/2009 |
| JP | A 2010-162683 | | 7/2010 |
| WO | WO 2009/154171 | A1 | 12/2009 |

* cited by examiner

POWER TOOL

BACKGROUND OF THE INVENTION

1. Field of the Invention

The invention relates to a power tool which performs a predetermined operation on a workpiece at least by axial linear movement of a tool bit.

2. Description of the Related Art

In a power tool in which an operation such as a hammering operation or a hammer drill operation is performed on a workpiece such as concrete by a tool bit, vibration is caused in the axial direction of the tool bit when the tool bit is driven. Therefore, some conventional power tools are provided with a vibration reducing mechanism for reducing vibration caused when the tool bit is driven.

For example, Japanese non-examined laid-open Patent Publication No. 2004-154903 discloses a power tool having a dynamic vibration reducer which serves to reduce vibration caused in the axial direction when the tool bit is driven, and the dynamic vibration reducer includes a dynamic vibration reducer body in the form of a cylindrical element, a weight which is housed within the cylindrical element and allowed to move in the axial direction of the tool bit, and an elastic element which connects the weight to the cylindrical element.

According to the power tool having the dynamic vibration reducer, a burden on the user can be alleviated by reduction of vibration caused during operation. However, the size of the power tool itself may be increased by installing the dynamic vibration reducer in the power tool, and in this point, further improvement is desired.

SUMMARY OF THE INVENTION

Accordingly, it is an object of the invention to provide a technique that contributes to size reduction in a power tool having a dynamic vibration reducer.

In order to solve the above-described problem, according to a preferred embodiment of the invention, a power tool is provided which performs a predetermined operation on a workpiece at least by axial linear movement of a tool bit coupled to a front end region of a housing. The power tool has a driving mechanism and a dynamic vibration reducer. The driving mechanism is housed within the housing and linearly drives the tool bit. The dynamic vibration reducer includes a weight which is allowed to linearly move under a biasing force of an elastic element, and by movement of the weight in the axial direction of the tool bit, the dynamic vibration reducer reduces vibration caused during operation. The "power tool" in the invention typically represents a hammer and a hammer drill, depending on the need for vibration reduction by a dynamic vibration reducer.

The preferred embodiment of the invention is characterized in that a dynamic vibration reducer housing space for housing the weight and the elastic element of the dynamic vibration reducer is integrally formed with the housing.

According to the invention, with the construction in which the dynamic vibration reducer housing space for housing the weight and the elastic element is integrally formed with the housing, compared with a conventional construction, for example, in which a cylindrical element for housing the weight and the elastic element is separately formed and installed in the housing, the number of parts can be reduced and size reduction can be realized.

According to a further embodiment of the power tool of the invention, the housing has an inner housing which houses the driving mechanism, and an outer housing which houses the inner housing, and the dynamic vibration reducer housing space is formed in the inner housing.

According to the invention, with the construction in which the dynamic vibration reducer housing space is formed in the inner housing, when the outer housing is removed, the inner housing including the dynamic vibration reducer housing space can be exposed to the outside. Thus, according to the invention, maintenance or repair of the dynamic vibration reducer can be made with the outer housing removed, so that this construction is rational.

According to a further embodiment of the power tool of the invention, the dynamic vibration reducer housing space has an elongate form extending in the axial direction of the tool bit and has one axial open end. The weight and the elastic element are inserted and housed in the dynamic vibration reducer housing space through an opening of the open end. Further, the dynamic vibration reducer has a sealing member which compresses the elastic element and seals the opening under a biasing force of the elastic element. The housing has a retaining member that retains the sealing member placed in a position to seal the opening. The manner of "sealing" by the sealing member in this invention suitably includes both the manner of fitting (inserting) the sealing member into the opening and the manner of fitting the sealing member over the opening. Further, the manner in which the retaining member "retains the sealing member placed in a position to seal" in this invention typically represents the manner in which the sealing member is inserted into the opening while compressing the elastic element, and then turned in the circumferential direction such that a rear surface of the sealing member in the direction of insertion is oppositely held in contact with the retaining member.

According to the invention, after the weight and the elastic element are inserted and installed in the dynamic vibration reducer housing space through the opening, the sealing member is inserted into the opening or fitted over the opening while compressing the elastic element and then held in a position to seal the opening by the retaining member. In this manner, the dynamic vibration reducer can be installed in the housing. Thus, according to the invention, the dynamic vibration reducer can be easily installed and dismantled.

According to a further embodiment of the power tool of the invention, a handgrip designed to be held by a user is detachably mounted to the housing on the side opposite the tool bit. When the handgrip is removed from the housing, the opening of the dynamic vibration reducer housing space faces the outside.

According to the invention, the dynamic vibration reducer can be easily installed and dismantled with respect to the housing with the handgrip detached from the housing.

According to a further embodiment of the power tool of the invention, a slide guide is provided within the dynamic vibration reducer housing space, and the weight is slidably held in contact with the slide guide. Further, the slide guide is held pressed against the sealing member by the biasing force acting in a direction of the opening.

According to the invention, by provision of the slide guide for the weight, smooth sliding movement of the weight can be ensured, and wear of the sliding surface can be prevented so that durability can be enhanced. Further, with the construction in which the slide guide is biased toward the opening, rattle of the slide guide caused in the longitudinal direction can be minimized so that noise can be prevented, and the slide guide can be easily taken out from the housing space when the dynamic vibration reducer is dismantled.

According to a further embodiment of the power tool of the invention, the driving mechanism includes a crank mechanism which converts rotation of the motor into linear motion and then drives the tool bit, and actively drives the weight by utilizing pressure fluctuations caused in an enclosed crank chamber which houses the crank mechanism.

The dynamic vibration reducer is inherently a mechanism which passively reduces vibration of the tool body when the weight is vibrated due to vibration of the housing. In this invention, the dynamic vibration reducer designed as such a passive vibration reducing mechanism is constructed such that the weight is vibrated by utilizing pressure fluctuations caused in the crank chamber, or the weight is actively driven, so that the vibration reducing function of the dynamic vibration reducer can be further enhanced. Particularly, in this invention, pressure fluctuations caused in the crank chamber are utilized as a means for driving the weight, so that it is not necessary to additionally provide the driving means for the weight. Therefore, consumption of power can be effectively reduced, and it can also be structurally simplified.

According to this invention, a technique is provided which contributes to size reduction in a power tool having a dynamic vibration reducer. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
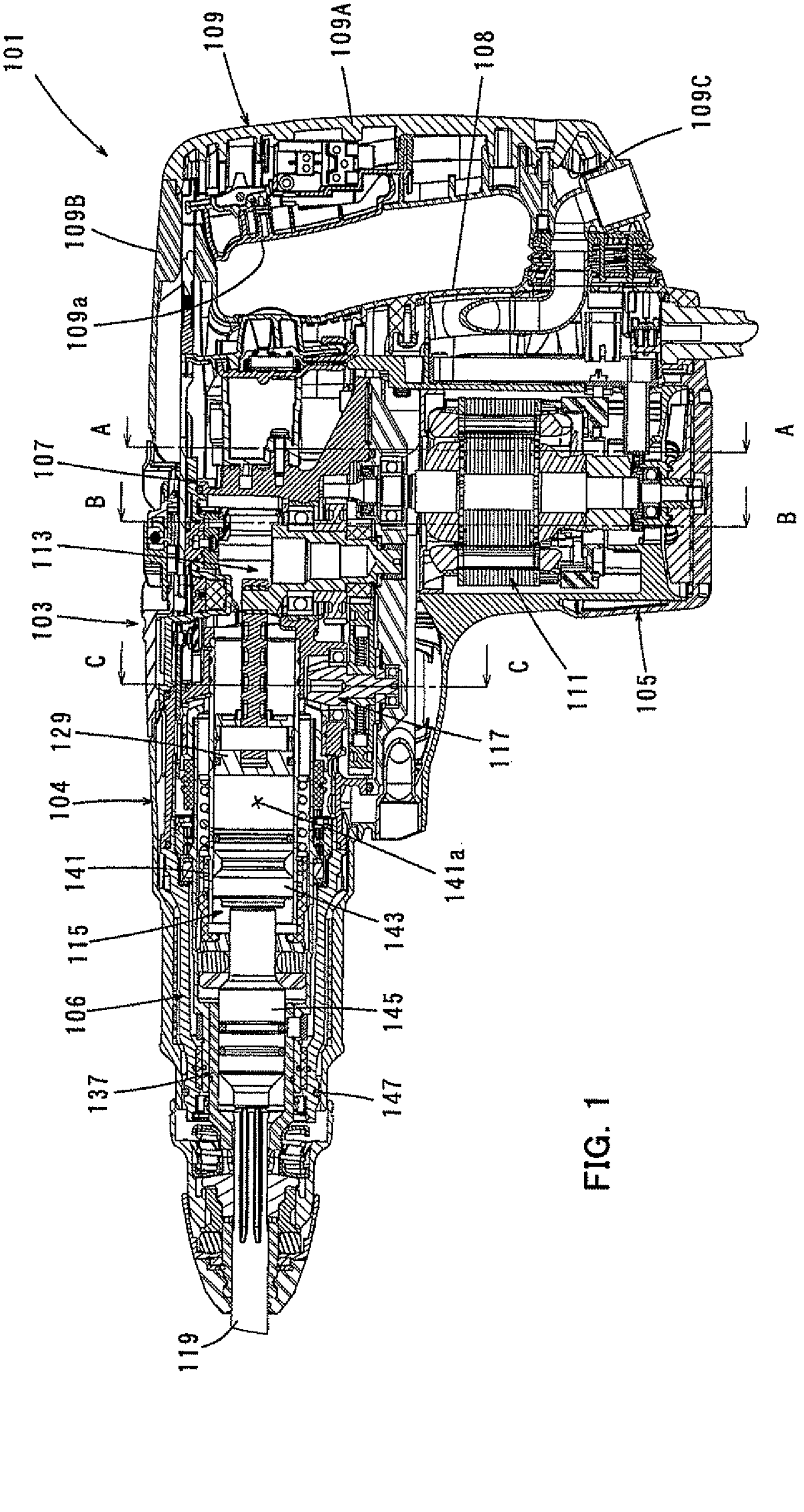
FIG. 1 is a sectional side view showing an entire structure of a hammer drill having a dynamic vibration reducer according to an embodiment of this invention.
Figure 2:
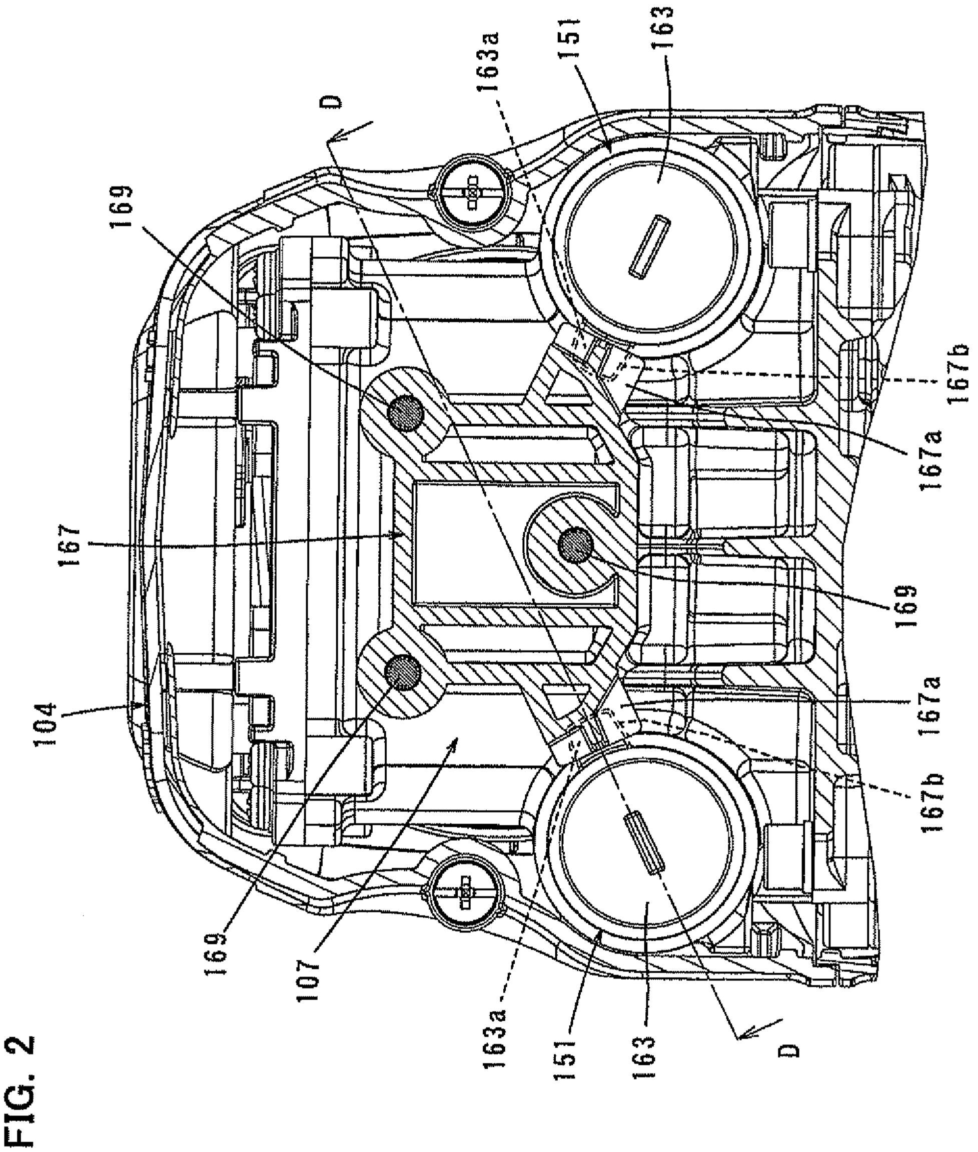
FIG. 2 is a sectional view taken along line A-A in FIG. 1.
Figure 3:
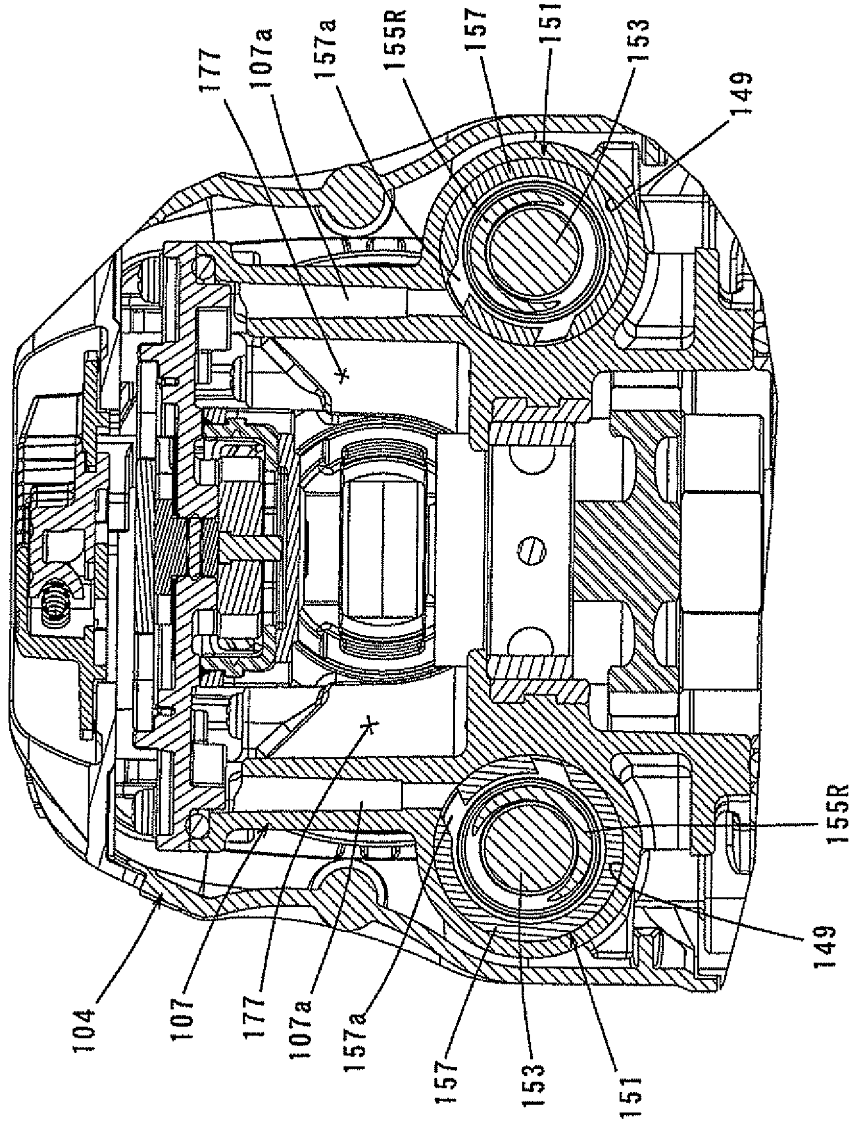
FIG. 3 is a sectional view taken along line B-B in FIG. 1.
Figure 4:
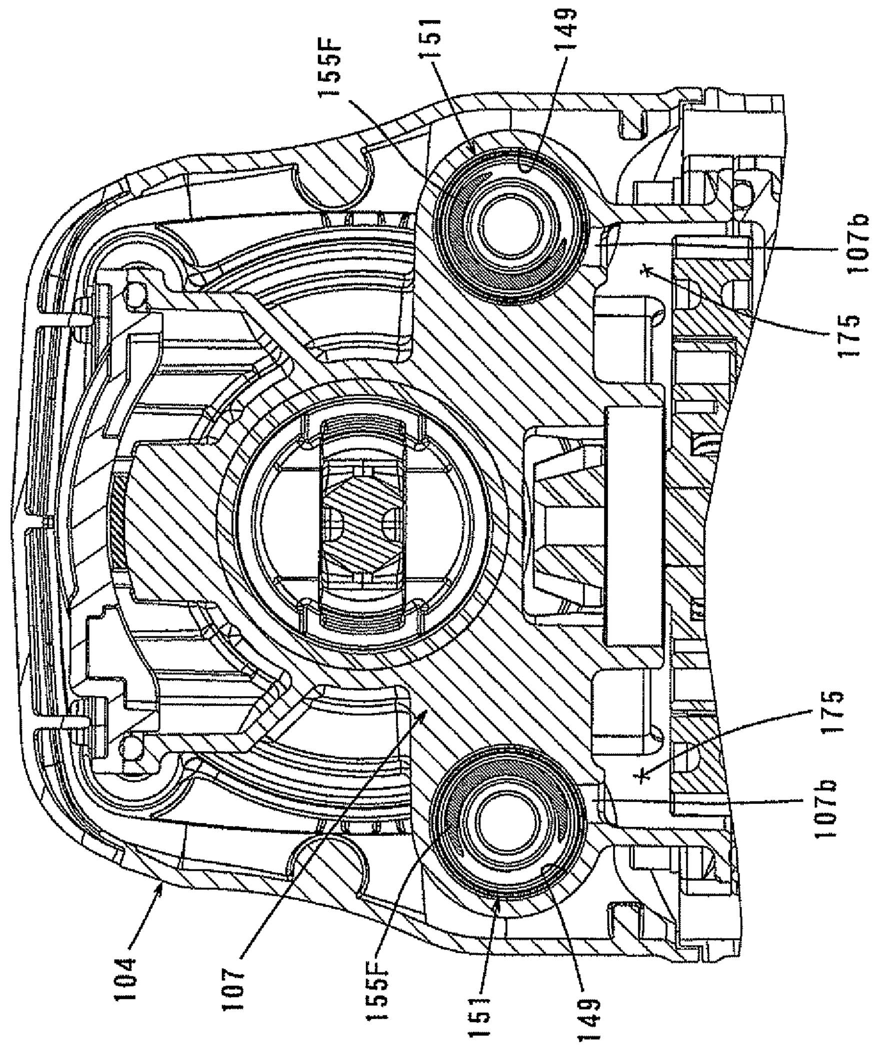
FIG. 4 is a sectional view taken along line C-C in FIG. 1.

An embodiment according to the invention is now described with reference to FIGS. 1 to 5. In this embodiment, an electric hammer drill is explained as a representative example of a power tool. As shown in FIG. 1, a hammer drill 101 according to this embodiment mainly includes a body 103 that forms an outer shell of the hammer drill 101, a hammer bit 119 detachably coupled to a front end region (left end as viewed in FIG. 1) of the body 103 via a hollow tool holder 137, and a handgrip 109 that is formed on the body 103 on the side opposite the hammer bit 119 and designed to be held by a user. The hammer bit 119 is held by the tool holder 137 such that it is allowed to linearly move in its axial direction with respect to the tool holder. The body 103, the hammer bit 119 and the handgrip 109 are features that correspond to the "housing", the "tool bit" and the "handgrip", respectively, according to the invention. Further, for the sake of convenience of explanation, the side of the hammer bit 119 is taken as the front and the side of the handgrip 109 as the rear.

The body 103 includes a motor housing 105 that houses a driving motor 111, a gear housing 107 that includes a barrel 106 and houses a motion converting mechanism 113, a striking mechanism 115 and a power transmitting mechanism 117, and an outer housing 104 that covers (houses) the gear housing 107. The motor housing 105 and the gear housing 107 are connected to each other by screws or other fastening means. The gear housing 107 and the outer housing 104 are features that correspond to the "inner housing" and the "outer housing", respectively, according to the invention.

The driving motor 111 is disposed such that its rotation axis runs in a vertical direction (vertically as viewed in FIG. 1) substantially perpendicular to the longitudinal direction of the body 103 (the axial direction of the hammer bit 119). The motion converting mechanism 113 appropriately converts rotational power of the driving motor 111 into linear motion and then transmits it to the striking mechanism 115. Then an impact force is generated in the axial direction of the hammer bit 119 (the horizontal direction as viewed in FIG. 1) via the striking mechanism 115. The power converting mechanism 113 and the striking mechanism 115 are features that correspond to the "driving mechanism" according to this invention. The power transmitting mechanism 117 appropriately reduces the speed of the rotational power of the driving motor 111 and transmits it to the hammer bit 119 via the tool holder 137, so that the hammer bit 119 is caused to rotate in its circumferential direction. Further, the driving motor 111 is driven when the user depresses a trigger **109*a* disposed on the handgrip 109**.

The motion converting mechanism 113 mainly includes a crank mechanism. When the crank mechanism is rotationally driven by the driving motor 111, a driving element in the form of a piston 129 which forms a final movable member of the crank mechanism linearly moves in the axial direction of the hammer bit within a cylinder 141. The power transmitting mechanism 117 mainly includes a gear speed reducing mechanism consisting of a plurality of gears and transmits the rotational power of the driving motor 111 to the tool holder 137. Thus, the tool holder 137 is caused to rotate in a vertical plane and thus the hammer bit 119 held by the tool holder 137 is also caused to rotate. The constructions of the motion converting mechanism 113 and the power transmitting mechanism 117 are well-known and therefore their detailed description is omitted.

The striking mechanism 115 mainly includes a striking element in the form of a striker 143 which is slidably disposed within the bore of the cylinder 141 together with the piston 129, and an intermediate element in the form of an impact bolt 145 which is slidably disposed within the tool holder 137. The striker 143 is driven via an air spring action (pressure fluctuations) of an air chamber **141*a* of the cylinder 141 which is caused by sliding movement of the piston 129, and then the striker collides with (strikes) the impact bolt 145 and transmits the striking force to the hammer bit 119 via the impact bolt 145**.

Further, the hammer drill 101 can be switched between a hammer mode in which an operation on a workpiece is performed by applying only a striking force in the axial direction to the hammer bit 119 and a hammer drill mode in which an operation on the workpiece is performed by applying a striking force in the axial direction and a rotational force in the circumferential direction to the hammer bit 119. This operation mode switching, however, is a known technique and not directly related to the invention, and therefore it is not described in further details.

In the hammer drill 101 constructed as described above, when the driving motor 111 is driven, the rotating output of the driving motor 111 is converted into linear motion via the motion converting mechanism 113 and then causes the hammer bit 119 to perform linear movement in its axial direction or striking movement via the striking mechanism 115. Further, in addition to the above-described striking movement, rotation is transmitted to the hammer bit 119 via the power transmitting mechanism 117 driven by the rotating output of the driving motor 111, so that the hammer bit 119 is also caused to rotate in its circumferential direction. Specifically, in hammer drill mode, the hammer bit 119 performs a hammer drill operation on the workpiece by striking movement in its axial direction and rotation in its circumferential direction. In hammer mode, transmission of the rotational power by the power transmitting mechanism 117 is interrupted by a clutch, so that the hammer bit 119 performs only the striking movement in its axial direction and thus performs a hammering operation on the workpiece.

The outer housing 104 covers an upper region of the body 103 which houses the driving mechanism, or the barrel 106 and the gear housing 107. Further, the handgrip 109 is integrally formed with the outer housing 104 and is designed as a handle which is generally D-shaped as viewed from the side and has a hollow cylindrical grip region 109A which extends in a vertical direction transverse to the axial direction of the hammer bit 119, and upper and lower connecting regions 109B, 109C which substantially horizontally extend forward from upper and lower ends of the grip region 109A.

In the handgrip 109 constructed as described above, the upper connecting region 109B is elastically connected to an upper rear surface of the gear housing 107 via a vibration-proofing first compression coil spring (not shown), and the lower connecting region 109C is elastically connected to a rear cover 108 covering a rear region of the motor housing 105 via a vibration-proofing second compression coil spring (not shown). Further, a front end region of the outer housing 104 is elastically connected to the barrel 106 via an O-ring 147. In this manner, the outer housing 104 including the handgrip 109 is elastically connected to the gear housing 107 and the motor housing 105 of the body 103 at a total of three locations, or the upper and lower ends of the grip region 109A of the handgrip 109 and the front end region. With such a construction, in the above-described hammering operation or hammer drill operation, transmission of vibration caused in the body 103 to the handgrip 109 is prevented or reduced. Further, the outer housing 104 including the handgrip 109 is designed to be detachable from the gear housing 107 and the motor housing 105 of the body 103.

The hammer drill 101 according to this embodiment is provided with a pair of right and left dynamic vibration reducers 151 in order to reduce vibration caused in the body 103 during hammering operation or hammer drill operation. Further, the right and left dynamic vibration reducers 151 have the same structure. In this embodiment, housing spaces 149 for the dynamic vibration reducers 151 are integrally formed with the gear housing 107. As shown in FIGS. 2 to 5, the right and left housing spaces 149 are formed in right and left lateral regions slightly below an axis of the cylinder 141 (the axis of the hammer bit 119) within the gear housing 107 and extend in parallel to the axis of the cylinder 141. Further, each of the housing spaces 149 is formed as an elongate circular space which has one end (front end) closed and the other end (rear end) forming an opening 149*a*. Moreover, each of the right and left housing spaces 149 is designed as a stepped hole having a large diameter on its open end side and a small diameter on its back side (front side). The housing space 149 is a feature that corresponds to the "dynamic vibration reducer housing space" according to this invention.

Figure 5:
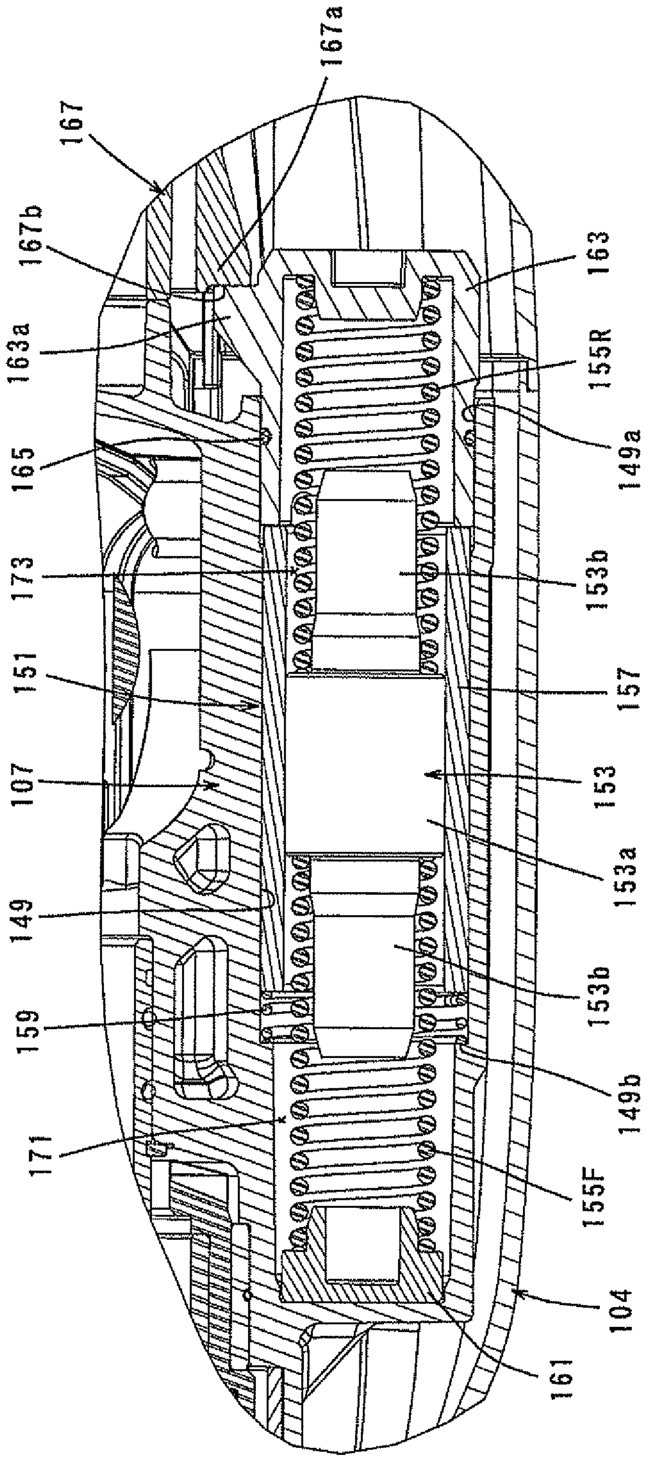
FIG. 5 is a sectional view taken along line D-D in FIG. 2.

As shown in FIG. 5, the dynamic vibration reducer 151 mainly includes a columnar weight 153 disposed in each of the housing spaces 149, front and rear biasing springs 155F, 155R disposed on both sides of the weight 153 in the axial direction of the hammer bit, a guide sleeve 157 for guiding the weight 153, and front and rear spring receivers 161, 163 subjected to biasing forces of the biasing springs 155F, 155R. The weight 153 and the biasing springs 155F, 155R are features that correspond to the "weight" and the "elastic element", respectively, according to this invention. The weight 153 has a large-diameter portion 153*a* and small-diameter portions 153*b* formed on the front and rear sides of the large diameter portion 153*a*. Further, the large diameter portion 153*a* slides in the axial direction with respect to the guide sleeve 157 in contact with an inner circumferential surface of the guide sleeve 157. The guide sleeve 157 is designed as a circular cylindrical member which serves to ensure stable sliding movement of the weight 153, and loosely fitted into the large-diameter bore including the opening 149*a* of the housing space 149. The guide sleeve 157 is a feature that corresponds to the "slide guide" according to this invention.

Each of the front and rear biasing springs 155F, 155R is formed by a compression coil spring. One end of the front biasing spring 155F is held in contact with the front spring receiver 161 disposed on the closed end of the housing space 149 and the other end is held in contact with an axial front end surface of the large-diameter portion 153*a* of the weight 153. One end of the rear biasing spring 155R is held in contact with the rear spring receiver 163 disposed on the open end of the housing space 149 and the other end is held in contact with an axial rear end surface of the large-diameter portion 153*a* of the weight 153. With such a construction, the front and rear biasing springs 155F, 155R apply respective spring forces to the weight 153 toward each other when the weight 153 moves in the longitudinal direction (the axial direction of the hammer bit 119) within the housing space 149.

The guide sleeve 157 is biased rearward in the longitudinal direction by a pressure spring 159 for preventing a rattle. The pressure spring 159 is formed by a compression coil spring and is designed such that one end is held in contact with a radial engagement surface (a stepped portion between the small-diameter bore and the large-diameter bore) 149*b* in an inner surface of the housing space 149 and the other end is held in contact with a front end surface of the guide sleeve 157. With such a construction, the guide sleeve 157 is biased rearward (toward the opening 149*a*) and a rear end surface of the guide sleeve 157 is received by the rear spring receiver 163. The rear spring receiver 163 is shaped like a cylindrical cap and designed such that its bottom receives the rear biasing spring 155R and its open front end surface is held in contact with the rear end surface of the guide sleeve 157.

The rear spring receiver 163 is fitted (inserted) into the opening 149*a* of the housing space 149 and seals the opening 149*a* via an O-ring 165 disposed between an outer circumferential surface of the rear spring receiver 163 and an inner circumferential surface of the opening 149*a*. Further, the rear spring receiver 163 fitted into the opening 149*a* compresses the front and rear biasing springs 155F, 155R and the pressure spring 159 and is in turn subjected to rearward biasing force. In this state, the rear spring receiver 163 is detachably retained (fastened) with respect to the gear housing 107 via a retaining plate 167. In order to allow attachment and detachment of the rear spring receiver 163 with respect to the retaining plate 167, an engagement protrusion 163*a* is formed on part of a rear outer surface of the rear spring receiver 163 in the circumferential direction and protrudes in a radial direction (a direction transverse to the axial direction of the hammer bit). The engagement protrusion 163*a* is engaged with (fitted into) an engagement recess 167*b* formed in the retaining plate 167, from the front. The rear spring receiver 163 and the retaining plate 167 are features that correspond to the "sealing member" and the "retaining member", respectively, according to this invention.

As shown in FIG. 1, the retaining plate 167 is disposed on a rear outer surface of the gear housing 107 and fastened thereto by a plurality of (three in this embodiment, see FIG. 2) screws 169. The retaining plate 167 has right and left projections 167*a* protruding in a direction transverse to the axial direction of the hammer bit. The engagement recess 167*b* which is engaged with the engagement protrusion 163*a* of the rear spring receiver 163 of the left dynamic vibration reducer 151 is formed in a front surface of the left projection 167*a*, and the engagement recess 167*h* which is engaged with the engagement protrusion 163*a* of the rear spring receiver 163 of the right dynamic vibration reducer 151 is formed in a front surface of the right projection 167*a*. The rear spring receiver 163 is press-fitted into the opening 149*a* of the housing space 149 and then turned around the axis to a position in which the engagement protrusion 163*a* is opposed to the engagement recess 167*b* of the retaining plate 167. In this state, when the pressing force is released from the rear spring receiver 163, the engagement protrusion 163*a* is fitted in the engagement recess 167*b* under the biasing forces of the front and rear biasing springs 155F, 155R and the pressure spring 159 upon the gear housing 107. Thus, the rear spring receiver 163 is prevented from moving in the circumferential direction and securely retained by the retaining plate 167.

Further, installation of the dynamic vibration reducer 151 into the gear housing 107 is made as described below. Firstly, the front spring receiver 161, the pressure spring 159, the guide sleeve 157, the front biasing spring 155F, the weight 153, the rear biasing spring 155R and the rear spring receiver 163 are inserted into the housing space 149 through the opening 149*a* in this order. Thereafter, the rear spring receiver 163 is retained by the retaining plate 167 in the above-described procedure. In this manner, the dynamic vibration reducer 151 can be easily installed in the gear housing 107. In order to dismantle the dynamic vibration reducer 151, the rear biasing spring 155R is pressed forward such that the engagement protrusion 163*a* is disengaged from the engagement recess 167*b* of the retaining plate 167, and turned around the axis. Thereafter, when the pressing force is released, components of the dynamic vibration reducer 151 can be easily taken out from the housing space 149.

Further, the housing space 149 which houses the dynamic vibration reducer 151 is partitioned into a front chamber 171 and a rear chamber 173 opposed to each other by the weight 153. The rear chamber 173 communicates with a crank chamber 177 which is formed as an enclosed space for housing the motion converting mechanism 113 in an internal space of the gear housing 107, via a communication hole 157*a* formed in a rear region of the guide sleeve 157 and a passage 107*a* formed in the gear housing 107 (see FIG. 3). The front chamber 171 communicates with a cylinder housing space 175 via a passage 107*b* formed in the gear housing (see FIG. 4). The cylinder housing space 175 is formed as an enclosed space for housing the power transmitting mechanism 117 and the cylinder 141.

When the hammer drill 101 is driven, pressures of the crank chamber 177 and the cylinder housing space 175 fluctuate as the motion converting mechanism 113 and the striking mechanism 115 are driven, and a phase difference between their pressure fluctuations is about 180 degrees. Specifically, the pressure of the cylinder housing space 175 is lowered when the pressure of the crank chamber 177 is raised, while the pressure of the cylinder housing space 175 is raised when the pressure of the crank chamber 177 is lowered. This is well known, and therefore it is not described in further detail.

In this embodiment, the pressure which fluctuates as described above is introduced into the front and rear chambers 171, 173 of the dynamic vibration reducer 151 and the weight 153 of the dynamic vibration reducer 151 is actively driven by utilizing the pressure fluctuations within the crank chamber 177 and the cylinder housing space 175. The dynamic vibration reducer 151 serves to reduce vibration by this forced vibration. With such a construction, a sufficient vibration reducing function can be ensured.

In this embodiment, the housing space 149 for housing the weight 153 and the biasing springs 155F, 155R of the dynamic vibration reducer 151 is integrally formed with the gear housing 107. Therefore, compared with a construction in which a cylindrical container for housing the weight 153 and the biasing springs 155F, 155R is separately formed and installed in the gear housing 107, the number of parts can be reduced and size reduction can be realized.

Further, according to this embodiment, in order to install the dynamic vibration reducer 151 in the housing space 149, components of the dynamic vibration reducer 151 such as the weight 153 and the biasing springs 155F, 155R are inserted into the housing space 149 through the opening 149*a* one by one. Thereafter, the rear spring receiver 163 is inserted into the opening 149*a* while compressing the biasing springs 155F, 155R and then turned around the axis such that the engagement protrusion 163*a* of the rear spring receiver 163 is elastically engaged with the engagement recess 167*b* of the retaining plate 167. In this manner, the dynamic vibration reducer 151 can be easily installed in the housing space 149. Further, the dynamic vibration reducer 151 in the housing space 149 can be easily dismantled by disengaging the engagement protrusion 163*a* of the rear spring receiver 163 from the engagement recess 167*b* of the retaining plate 167.

Further, in this embodiment, the guide sleeve 157 which is loosely fitted in the housing space 149 in order to ensure the sliding movement of the weight 153 is biased toward the opening 149*a* and pressed against the front end surface of the rear spring receiver 163 by the pressure spring 159. With such a construction, the guide sleeve 157 can be prevented from rattling, and compared with a construction in which the guide sleeve 157 is prevented from rattling, for example, by using an O-ring, the guide sleeve 157 can be more easily removed from the housing space 149 when the dynamic vibration reducer 151 is dismantled. Moreover, grooving of the guide sleeve 157 which is necessary for the construction using an O-ring can be dispensed with, so that cost reduction can also be achieved.

Further, according to this embodiment, when the outer housing 104 including the handgrip 109 is removed, the opening 149*a* of the housing space 149 faces the outside or is exposed. Therefore, even in the construction in which the housing space 149 of the dynamic vibration reducer 151 is integrally formed with the gear housing 107, maintenance or repair of the dynamic vibration reducer 151 can be easily made.

Further, in the above-described embodiment, the hammer drill 101 is described as a representative example of the power tool, but the invention can be applied not only to the hammer drill 101 but to a hammer and other power tools which perform an operation on a workpiece by linear movement of a tool bit. For example, it can be suitably applied to a jig saw or a reciprocating saw which performs a cutting operation on a workpiece by reciprocating movement of a saw blade.

Further, in this embodiment, the handgrip 109 is described as being integrally formed with the outer housing 104, but the technique of the invention can also be applied to a hammer drill or an electric hammer of the type in which the handgrip 109 is separately formed from the outer housing 104 and detachably mounted to the body 103 including the outer housing 104, the gear housing 107 and the motor housing 105.

Further, in this embodiment, the retaining plate 167 for retaining the rear spring receiver 163 inserted into the opening 149*a* of the housing space 149, in the inserted position is described as being fastened to the gear housing 107 by the screws 169. The retaining plate 167, however, may be integrally formed with the gear housing 107. Further, it is described as being constructed such that the rear spring receiver 163 is inserted (fitted) into the opening 149*a*, but it may be constructed such that the rear spring receiver 163 is fitted over the opening 149*a*.

In view of the aspect of the invention, following features can be provided.

(1)

"A power tool, which performs a predetermined operation on a workpiece at least by axial linear movement of a tool bit coupled to a front end region of a housing, comprising:

a driving mechanism that is housed within the housing and linearly drives the tool bit, and a dynamic vibration reducer that includes a weight which is allowed to linearly move under a biasing force of an elastic element, and reduces vibration caused during operation, by movement of the weight in the axial direction of the tool bit, wherein:

a dynamic vibration reducer housing space for housing the weight and the elastic element of the dynamic vibration reducer is integrally formed with the housing, so that size reduction is realized."

(2)

"The power tool as defined in claim 3, wherein the retaining member is separately formed from the housing and fastened to the housing by screws."

(3)

"The power tool as defined in claim 3, wherein the retaining member is integrally formed with the housing."

DESCRIPTION OF NUMERALS

101 hammer drill (power tool)
103 body
104 outer housing
105 motor housing
106 barrel
107 gear housing
107*a* passage
107*b* passage
108 rear cover
109 handgrip (main handle)
109A grip region
109B upper connecting region
109C lower connecting region
109*a* trigger
111 driving motor
113 motion converting mechanism (driving mechanism)
115 striking mechanism (driving mechanism)
117 power transmitting mechanism
119 hammer bit (tool bit)
129 piston (driving element)
137 tool holder
141 cylinder
141*a* air chamber
143 striker (striking element)
145 impact bolt (intermediate element)
147 O-ring
149 housing space
149*a* opening
149*b* engagement surface
151 dynamic vibration reducer
153 weight
155F front biasing spring (elastic element)
155R rear biasing spring (elastic element)
157 guide sleeve
157*a* communication hole
159 pressure spring
161 front spring receiver
163 rear spring receiver (sealing member)
163*a* engagement protrusion
165 O-ring
167 retaining plate (retaining member)
167*a* projection
167*b* engagement recess
169 screw
171 front chamber
173 rear chamber
175 cylinder housing space
177 crank chamber

What we claim is:

1. A power tool, which performs a predetermined operation on a workpiece at least by axial linear movement of a tool bit coupled to a front end region of a housing, the power tool comprising:

a driving mechanism that is housed within the housing and linearly drives the tool bit, and a dynamic vibration reducer that includes a weight which is allowed to linearly move under a biasing force of an elastic element, the dynamic vibration reducer being configured to reduce vibration caused during operation by movement of the weight in the axial direction of the tool bit, wherein:

a dynamic vibration reducer housing space houses the weight and the elastic element of the dynamic vibration reducer, the dynamic vibration reducer housing space being integrally formed with the housing, the dynamic vibration reducer housing space has an elongated shape extending in the axial direction of the tool bit and has one axial open end such that the weight and the elastic element are insertable into and removable from the dynamic vibration reducer housing space through an opening of the open end without displacement of the dynamic vibration reducer housing with respect to the tool bit in a direction crossing the axial direction of the tool bit, wherein the elastic element has a diameter that is smaller than a diameter of the open end, the dynamic vibration reducer has a sealing member that compresses the elastic element and seals the opening under a biasing force of the elastic element, the housing has a retaining member that retains the sealing member placed in a position to seal the opening, a slide guide is disposed within the dynamic vibration reducer housing space, the weight is slidably held in contact with the slide guide, and the slide guide is held pressed against the sealing member by the biasing force acting in a direction of the opening, the slide guide is disposed between a pressure spring at a first end of the slide guide and an O-ring at a second end of the slide guide.

2. The power tool as defined in claim 1, wherein the housing has an inner housing which houses the driving mechanism, and an outer housing which houses the inner housing, and the dynamic vibration reducer housing space is formed in the inner housing.

3. The power tool as defined in claim 1, wherein a handgrip designed to be held by a user is detachably mounted to the housing on the side opposite the tool bit, and the opening of the dynamic vibration reducer housing space faces the outside when the handgrip is removed from the housing.

4. The power tool as defined in claim 1, wherein:

the driving mechanism includes a crank mechanism configured to convert rotation of the motor into linear motion and then to drive the tool bit, and configured to actively drive the weight by utilizing pressure fluctuations caused in an enclosed crank chamber which houses the crank mechanism.

5. The power tool as defined in claim 1, wherein the retaining member is separate from the housing and fastened to the housing by screws.

6. The power tool as defined in claim 1, wherein the retaining member is integrally formed with the housing.

7. The power tool as defined in claim 1, wherein the opening of the open end is located on a rear end surface of the housing where the rear end surface is opposite of the front end region of the housing.

8. The power tool as defined in claim 1, wherein a shape of the opening of the open end is defined by an axial cross-section of the dynamic vibration reducer.

9. The power tool as defined in claim 1, wherein the slide guide has an inner circumferential surface configured to guide the weight in the axial direction.

10. The power tool as defined in claim 1, wherein the retaining member of the housing retains the sealing member against the biasing force of the elastic element, the sealing member being placed in a position to seal the opening under the biasing force of the elastic element.

* * * * *